United States Patent
Stubblefield et al.

(10) Patent No.: US 12,041,459 B2
(45) Date of Patent: *Jul. 16, 2024

(54) USER AUTHENTICATION BASED ON SS7 CALL FORWARDING DETECTION

(71) Applicant: TeleSign Corporation, Marina del Rey, CA (US)

(72) Inventors: Stacy Lyn Stubblefield, Los Angeles, CA (US); Vladimir Vujovic, Belgrade (RS); Milovan Kovacevic, Belgrade (RS)

(73) Assignee: Telesign Corporation, Marina del Ray, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 17/176,416

(22) Filed: Feb. 16, 2021

(65) Prior Publication Data

US 2021/0266750 A1  Aug. 26, 2021

Related U.S. Application Data

(63) Continuation of application No. 16/692,110, filed on Nov. 22, 2019, now Pat. No. 10,924,922, which is a
(Continued)

(51) Int. Cl.
  *H04L 29/06* (2006.01)
  *H04L 9/40* (2022.01)
(Continued)

(52) U.S. Cl.
CPC ......... *H04W 12/72* (2021.01); *H04L 63/0876* (2013.01); *H04L 63/1433* (2013.01);
(Continued)

(58) Field of Classification Search
CPC .. H04L 63/0876; H04L 63/1433; H04W 8/26; H04W 12/72
See application file for complete search history.

(56) References Cited

U.S. PATENT DOCUMENTS

| | | | | |
|---|---|---|---|---|
| 2002/0168060 A1* | 11/2002 | Huie | ...................... | H04M 3/38 379/188 |
| 2012/0003957 A1* | 1/2012 | Agevik | .................. | H04W 12/10 455/410 |

(Continued)

*Primary Examiner* — Rodman Alexander Mahmoudi
(74) *Attorney, Agent, or Firm* — Perkins Coie LLP

(57) ABSTRACT

A user authentication system that analyzes call forwarding information obtained from telecommunication networks, such as through the use of Signaling System No. 7 ("SS7") protocols, to detect the possibility of fraud. In response to a request to access a network-accessible service, the system performs an initial authentication of provided user account credentials. The system then obtains a telecommunication subscriber identifier that is associated with the user account. Prior to performing additional device-based user authentication, the system obtains call forwarding information for the user. The obtained call forwarding information is then evaluated for potentially fraudulent call forwarding configurations. For example, call forwarding to certain call forwarding numbers, or the use of different call forwarding types, may be indicative of fraud intended to undermine further user authentication.

17 Claims, 4 Drawing Sheets

Related U.S. Application Data continuation of application No. 15/787,588, filed on Oct. 18, 2017, now Pat. No. 10,492,070.

(51) Int. Cl.
*H04M 3/58* (2006.01)
*H04M 7/12* (2006.01)
*H04Q 3/00* (2006.01)
*H04W 4/021* (2018.01)
*H04W 4/14* (2009.01)
*H04W 4/16* (2009.01)
*H04W 4/20* (2018.01)
*H04W 12/06* (2021.01)
*H04W 12/72* (2021.01)
*H04W 8/26* (2009.01)

(52) U.S. Cl.
CPC ............ *H04M 3/58* (2013.01); *H04M 7/127* (2013.01); *H04Q 3/0025* (2013.01); *H04W 4/021* (2013.01); *H04W 4/14* (2013.01); *H04W 4/16* (2013.01); *H04W 4/20* (2013.01); *H04W 12/06* (2013.01); *H04M 2203/6027* (2013.01); *H04M 2203/6081* (2013.01); *H04W 8/26* (2013.01)

(56) References Cited

U.S. PATENT DOCUMENTS

| | | | |
|---|---|---|---|
| 2012/0130898 A1* | 5/2012 | Snyder | G06Q 20/425 705/44 |
| 2014/0223552 A1* | 8/2014 | Petersen | H04M 3/54 726/19 |
| 2015/0026786 A1* | 1/2015 | Alexander | H04W 12/128 726/7 |
| 2015/0223065 A1* | 8/2015 | Sporton | H04W 12/06 455/411 |
| 2015/0350869 A1* | 12/2015 | Karshenas Najafabadi | H04W 8/02 455/432.1 |
| 2016/0007204 A1* | 1/2016 | Park | H04W 12/128 726/23 |
| 2016/0219436 A1* | 7/2016 | Bhasin | H04W 12/06 |
| 2020/0322483 A1* | 10/2020 | Anand | H04M 3/543 |

* cited by examiner

Table 400:

| Phone Number | Forwarding type | Forwarding number | Fraud Status |
|---|---|---|---|
| (555) 123-0123 | Unconditional | (555) 555-1212 | OK |
| (718) 123-4567 | Busy | (212) 123-4567 | OK |
| (978) 121-2121 | No reply | (206) 555-5309 | Fraudulent |
| (412) 222-3333 | Not reachable | (412) 111-2222 | OK |
| ... | ... | ... | ... |
| (555) 123-0123 | Unconditional | (212) 222-3333 | Fraudulent |

405 / 410 / 415 / 420

Table 450:

| Forwarding type | Forwarding number | Fraud Status |
|---|---|---|
| No reply | (555) 555-1212 | OK |
| Busy | (212) 123-4567 | OK |
| No reply | (206) 555-5309 | Fraudulent |
| Not reachable | (412) 111-2222 | Fraudulent |
| ... | ... | |
| Unconditional | (212) 222-3333 | Fraudulent |

USER AUTHENTICATION BASED ON SS7 CALL FORWARDING DETECTION

CROSS-REFERENCE TO RELATED APPLICATIONS

This application is a continuation of U.S. patent application Ser. No. 16/692,110 (now U.S. Pat. No. 10,924,922) entitled "USER AUTHENTICATION BASED ON SS7 CALL FORWARDING DETECTION," filed on Nov. 22, 2019, which is a continuation of U.S. patent application Ser. No. 15/787,588 (now U.S. Pat. No. 10,492,070) entitled "USER AUTHENTICATION BASED ON SS7 CALL FORWARDING DETECTION," filed on Oct. 18, 2017, the disclosures of which are incorporated herein by reference in their entireties.

BACKGROUND

Internet users regularly register accounts with websites, cloud applications, or other online services. The user's account information, including a username and password, is generally kept securely by the service and used for the purpose of authenticating that a subsequent visitor to the service is the user they purport to be. Once authenticated, the user is granted access to the service.

Most online services use traditional username and password checks as a first layer of security. To improve account security, online services may also layer additional factors of authentication before authenticating a user. A common form of a second factor of authentication involves the exchange of a one-time code between the online service and a visitor to the service via a verification device that has already been associated with a user of the service. By successfully exchanging the one-time code, the service visitor ostensibly demonstrates their possession of the verification device, thereby providing a further indication that they are the user they purport to be. Often the verification device is the user's mobile telephone and is distinct from the login device used to access the online service, or receives the one-time code through a communication channel different from that used by the login device. By authenticating users through a combination of a username and password check as well as one-time code exchange (the combination commonly referred to as two-factor authentication, or "2FA"), online services are able to more securely grant account access to only intended users while preventing access by those who have compromised one of the two security layers.

Unfortunately, the additional security provided by two-factor authentication can be undermined by an unauthorized individual, by manipulating communication with the verification device or the device itself. For example, if a one-time code that is intended for the verification device of a user is instead received by a different device in possession of an unauthorized individual, then the unauthorized individual may be able to exchange the one-time code with the online service, thereby making the individual appear to be in possession of the known verification device. In other words, the unauthorized individual may be able to satisfy the second factor of authentication without actual possession of the verification device associated with the user, thus aiding the individual's unauthorized access of the user account. It would therefore be desirable to be able to identify when the one-time code exchange between an online service and a trusted verification device associated with a user account has been compromised, thereby preventing potentially fraudulent access to the user account.

BRIEF DESCRIPTION OF THE DRAWINGS

FIG. 4 is an illustration of tables containing known fraudulent and trusted call forwarding numbers, as may be used by the SS7-call-forwarding-based user authentication system.

Figure 1:
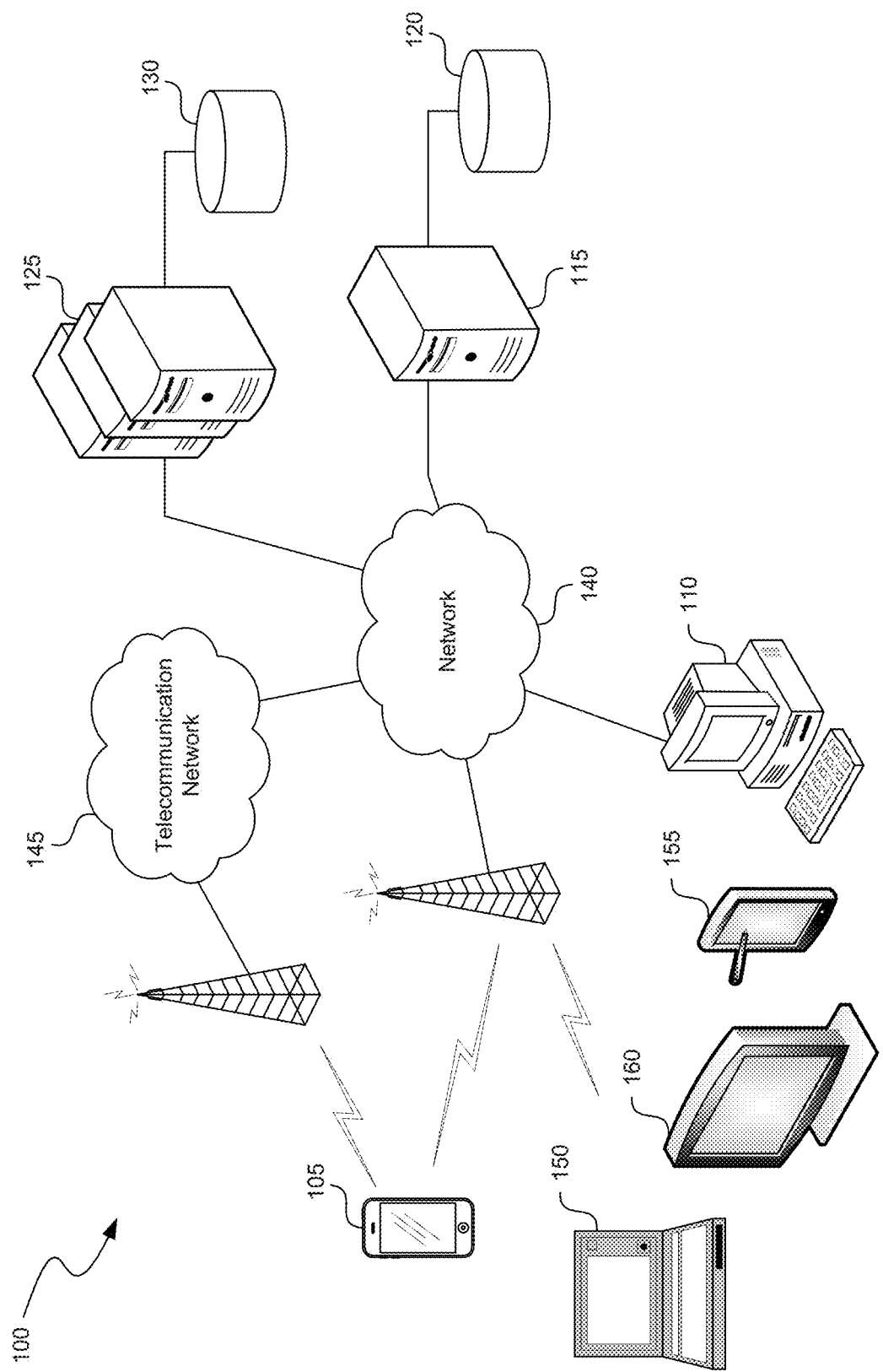
FIG. 1 is a diagram of a representative environment in which a user authentication system based on SS7 call forwarding information may operate.

The techniques introduced in this disclosure can be better understood by referring to the following Detailed Description in conjunction with the accompanying drawings.

DETAILED DESCRIPTION

A system that analyzes call forwarding information obtained from telecommunication networks, such as through the use of Signaling System No. 7 ("SS7") protocols, to facilitate user authentication in connection with the use of a website, an online application, a mobile application, or other network-accessible service is disclosed herein. In response to a request to access a network-accessible service, such as registering an account with the service or logging into a previously-registered account associated with the service, the system performs an initial authentication of any provided user account credentials (e.g., verifies that a provided username and password match the username and password of a previously-registered user account). The system then obtains information related to the user's subscription to a telecommunication network, such as a mobile communication number belonging to the user, or an identifier uniquely identifying the user (or "subscriber") on the telecommunication network. Prior to performing additional device-based user authentication, the system obtains call forwarding information for the user's telecommunication network subscription using the obtained subscriber information. Call forwarding information may be obtained, for example, by querying the telecommunication network with which the subscriber is associated or other telecommunication networks accessible to the system, using SS7 requests. The system then evaluates the obtained call forwarding information for indications of fraud associated with the user. For example, as described herein, call forwarding to certain call forwarding numbers, or the use of different call forwarding types, may be indicative of attempted fraud.

Further authentication of the request to access the network-accessible service, thereby granting access, is performed based on the system's determination of whether there is an attempt at user fraud. For example, if the system determines that there are no fraud indications, then the system may perform one-time-code-based authentication using the mobile communication device, thereby verifying that the individual attempting to access the network-accessible service has the device and is, in all likelihood, the purported user. Code-based authentication may be performed, for example, using a code sent to the mobile communication device using a Short Message Service ("SMS") message or other text-based message, or a voice call to the device that recites a code. However, if the system determines that there is a possibility of fraud associated with the user (e.g., suspicious call forwarding is enabled for the user's telecommunication network subscription), the system may deny the request to access the network-accessible service. As a still further example, if the system determines that there is a possibility of fraud associated with the user, the system may perform one-time-code-based authentication using the mobile communication device, but upon successful exchange of the code, indicate to the network-accessible service the identified possibility of fraud. As an additional example, if the system determines that there is a possibility of fraud associated with the user, the system may attempt to authenticate the purported user using an alternative method or channel (e.g., using pre-set security challenge questions, code-based exchange via an alternative communication channel, etc.). In other words, by evaluating call forwarding information, the system is able to detect a mechanism of fraud used to undermine layers of authentication that rely on authentication devices (such as the device-based exchange of one-time codes, commonly used in 2FA authentication systems), thereby improving the security of user authentication.

In some embodiments, the system obtains call forwarding information by querying a telecommunication network using SS7 protocols. For example, the system may use the Mobile Application Part ("MAP") protocol request InterrogateSS, which obtains information on supplementary services used by mobile subscribers and mobile communication devices, to determine whether the user has call forwarding active. In addition to determining whether call forwarding is active, the InterrogateSS command retrieves the call forwarding number to which incoming calls are to be forwarded, as well as the type of call forwarding that is active (i.e., the condition under which an incoming call is to be forwarded to the call forwarding number). While other signaling techniques for obtaining call forwarding information can detect "early" call forwarding types (i.e., unconditional call forwarding or call forwarding when the subscriber's mobile communication device is unreachable/powered off), it should be noted that the InterrogateSS request is able to detect early call forwarding types (i.e., unconditional and unreachable) as well as call forwarding busy and call forwarding no reply/no answer—thereby enabling the system to detect additional call forwarding scenarios. It has also been observed that the InterrogateSS request is more reliably enabled by carriers, whom are able to configure which requests are available to external networks on the carrier networks, thereby improving the coverage of carriers for which call forwarding information can be obtained by the system. The use of the InterrogateSS request is enabled by the system's access to the SS7 network. Though primarily described with respect to using the InterrogateSS request, the system may obtain call forwarding information associated with a subscriber by utilizing other queries directed to a SS7 network or other telecommunication network.

In some embodiments, the system obtains call forwarding information using alternative network messages and requests. For example, in a telecommunication network other than an SS7 network, the system may utilize a single command or combination of commands that provides at least some of the call forwarding information described herein.

In some embodiments, the system uses information specific to users or mobile communication devices associated with users to help determine whether call forwarding information is indicative of fraud. For example, for different users the system may maintain a list of trusted forwarding numbers associated with that user or the user's associated mobile communication device, which do not cause an indication of fraud when calls are forwarded to the trusted forwarding number. Trusted forwarding numbers may be provided by a user to the system, may be identified by the system based on subsequent authentication after an unknown forwarding number is being used for a user, or by other technique which demonstrates the trusted nature of the unknown forwarding number. The user-specific trusted forwarding information may additionally include indications of forwarding type, such that a forwarding number is treated as trusted when one type of call forwarding is active (e.g., forward on busy), but not treated as trusted when a second type of call forwarding is active (e.g., forward unconditional).

In some embodiments, the system maintains known trusted and untrusted forwarding numbers applicable to all mobile subscribers. For example, some carriers configure subscriber call forwarding to a specific number used for voicemail; the system may maintain a list of carrier-defined voicemail numbers such that the identification of call forwarding to one of those numbers does not cause an indication of fraud. As an additional example, the system may maintain a list of forwarding numbers that have been identified from previous fraud attempts; when incoming calls to a user are forwarded to one of those numbers, the system may determine there is a high likelihood of fraud. As a further example, the system may maintain an indication of carriers that are frequently associated with fraud. For example, it has been observed that certain carriers that provide prepaid services are typically used briefly for fraudulent purposes, and then the service is disposed of. The system may identify when call forwarding is active to any number belonging to the suspect carrier, and indicate a likelihood of fraud accordingly.

Though primarily described with reference to call forwarding activated for incoming calls to a user's mobile communication number, the system for SS7-call-forwarding-based user authentication may detect other forms of forwarding. For example, the system may be used to detect when SMS message forwarding is activated for a mobile communication number, which could be used to undermine a SMS-based one-time code exchange.

Though primarily described with reference to a mobile telecommunication network, the system for SS7-call-forwarding-based user authentication may be used to detect forwarding associated with other telecommunication networks that can be used to enhance user authentication. For example, the system may be used in connection with a landline telephone number associated with a user account and connected to a landline network, a mobile pager, or other forms of verification device that facilitate 2FA authentication.

Though primarily described with reference to verifying a request to access a network-accessible service using a previously-registered user account, it will be appreciated that the SS7-call-forwarding-based user authentication system can be used in connection with other types of accesses to online or financial services. For example, as part of a process for creating a user account that requires registering a mobile communication number to the account during account creation, the system may evaluate call forwarding information of the number to be registered in order to identify indications of fraud at account creation. As further examples, the system may evaluate call forwarding information for fraud when a user is attempting to wire money to or from a bank, when a user is attempting a credit card transaction, when a user is performing account maintenance associated with an online account (e.g., changing an account password, account contact information, or other account settings), etc. That is, the system can be used to detect indications of forwarding fraud in any scenario in which a telephone call, SMS message, or other form of code exchange is being used to authenticate a transaction or network-accessible service access.

Though the system for SS7-call-forwarding-based user authentication is described in the context of a 2FA authentication system in which a first factor of authentication comprises the authentication of user credentials (e.g., a username and password) and a second factor of authentication comprises authentication based on one-time code exchange, it will be appreciated that the system can be used with other layers or forms of user authentication. For example, the system can be used in an embodiment in which a first factor of authentication comprises the providing of a username, without a password, in which the exchange of one-time codes via a verified telephone number provides adequate authentication. In said embodiment the system may, for example, verify that the provided username is registered with or otherwise known to the system or network-accessible service. As a further example, the system can be used in an embodiment in which authentication is performed using only the mobile communication device based on the verification of the mobile communication number associated with the mobile communication device. It will be appreciated that the system can be used in any embodiment of user authentication (including multi-factor factor authentication) in which a factor of authentication is based on communication with a mobile communication device and/or using a telephone number associated with the device.

Various implementations of the system will now be described. The following description provides specific details for a thorough understanding and an enabling description of these implementations. One skilled in the art will understand, however, that the system may be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 and the following discussion provide a brief, general description of a suitable environment in which a system for authenticating users based on SS7-obtained call forwarding information may be implemented. Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions may reside on a client computer.

FIG. 1 illustrates an example environment 100 in which a SS7-call-forwarding-based user authentication system operates. The environment may include a mobile communication device 105, a personal computing device 110, a laptop computer 150, a tablet computer 155, and television 160, each of which may be used by a user to access a server computer 115 and one or more third-party server computers 125. The server computers 115 and 125 utilize data storage areas 120 and 130, respectively. As will be described in more detail herein, the SS7-call-forwarding-based user authentication system may in part reside on the server computer 115, and assist with the identification and authentication of a user who is utilizing a personal computing device 110, mobile communication device 105, laptop computer 150, tablet computer 155, or television 160 to access websites, applications (e.g., mobile application, "smart" television applications, etc.) or other network-accessible services provided by the third-party server computers 125. For example, a user may attempt to access a network-accessible service with a personal computing device 110 used as a "login device," and the system may authenticate the user request based on, in part, whether call forwarding is active for incoming calls or messages to the mobile communication device 105 (a "verification device") and whether the user successfully exchanges one-time codes via the verification device.

The data storage area 120 contains data utilized by the SS7-call-forwarding-based user authentication system, and, in some implementations, software necessary to perform functions of the system. For example, the data storage area 120 may contain data associated with a user, such as a registered username and password, as well as a mobile communication number belonging to the user and associated with the user's mobile communication device. As a further example, the data storage area 120 may store known trusted and untrusted call forwarding numbers, associated with a user or known generally. As will be described in more detail herein, as part of an authentication process, the system obtains call forwarding information for incoming calls or messages to the mobile communication number, and uses the call forwarding information to identify the potential of fraud before performing additional layers of authentication (such as one-time code exchange utilizing the mobile communication device).

The mobile communication device 105, personal computing device 110, laptop computer 150, tablet computer 155, television 160, server computer 115 and third-party server computers 125 communicate with each other through one or more public or private, wired or wireless networks 140 and 145, including, for example, the Internet and telecommunication networks. The mobile communication device 105 communicates wirelessly with a base station or access point using a wireless mobile telephone standard, such as the Global System for Mobile Communications (GSM), Long Term Evolution (LTE), IEEE 802.11, or another wireless standard, and the base station or access point communicates with the server computer 115 and third-party server computers 125 via the network 140. Personal computing device 110 communicates through the network 140 using, for example, TCP/IP protocols. The mobile communication device 105 additionally communicates wirelessly with the telecommunication network 145 using, for example, nearby cell towers or base stations using wireless mobile telephone standards, such as Global System for Mobile Communications (GSM), CDMA (Code Division Multiple Access), General Packet Radio Service (GPRS), and the like. The telecommunication network 145 may support and be operated using SS7 protocols and procedures. The network 140 and telecommunication network 145 may be interconnected such that, for example, a mobile communication device 105 connected to the telecommunication network 145 can communicate via the network 140 with server computer 115, third-party server computers 125, and other devices connected to the network. The mobile communication device 105 utilizes applications or other software, which operate through the use of computer executable instructions. Some such applications may be directed toward the user authentication process (e.g., receiving a one-time code from the system and providing it to a user). As will be described in more detail herein, the authentication system residing at least in part on the server computer 115 may also utilize software which operates through the use of computer-executable instructions as part of the authentication process.

Flows for Authenticating a User Based on SS7 Call Forwarding Information

Figure 2:
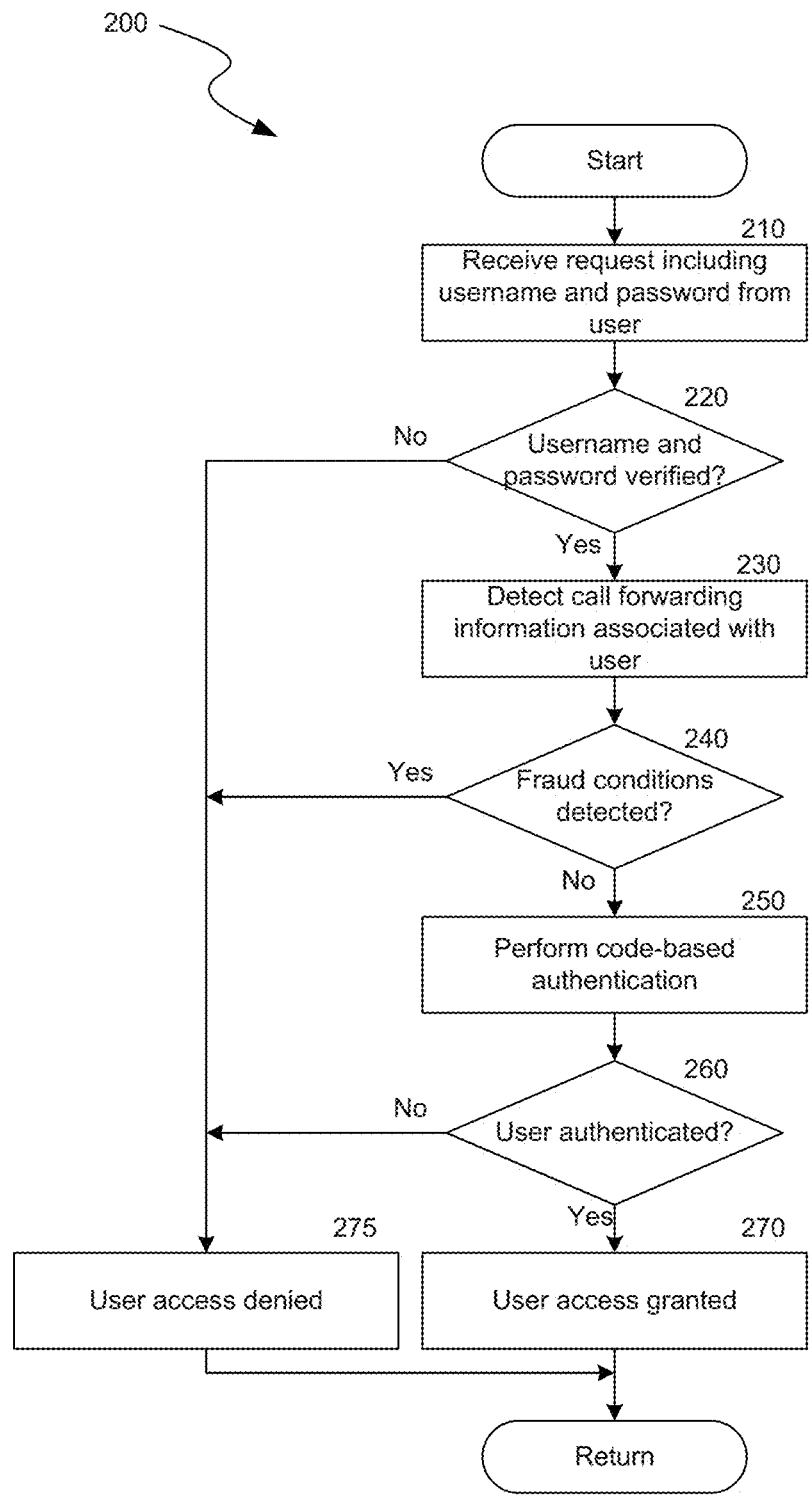
FIG. 2 is a flow chart of a process implemented by the SS7-call-forwarding-based user authentication system to grant a user access to a service.

FIG. 2 is a flow diagram illustrating example process 200, implemented by a SS7-call-forwarding-based user authentication system, for authenticating a request to access network-accessible service.

The process 200 begins at block 210, where the system receives an individual request to access network-accessible service. The request may include information identifying a user account previously registered with the service (e.g., a username) (the "purported user"), as well as verification information associated with the registered account (e.g., a password).

At a decision block 220, the system determines whether the information included as part of the request satisfies an initial authentication check. For example, the system verifies that there is a previously-registered account for the network-accessible service that is associated with the provided username. As a further example, if the information received as part of the user request includes a password, the system may further verify that the previously-registered account is associated with a password that matches the received password. If it is determined that the provided username and password are not verifiable for the service, then the process continues to a block 275. If it is determined that the provided username and password are valid for the service, then processing continues to a block 230.

In some embodiments the system receives the request to access the network-accessible service from the service. When the request is received from the service, aspects of initial authentication may have been performed by the service before the request was transmitted to the system. For example, the service (or a different authentication service) may have already verified that a username and password received from a user matches a previously-registered account of the service. When initial authentication has been performed by a different service, the request received by the system may be to perform additional authentication (e.g., based on call forwarding information). In those embodiments the process 200 may continue from the block 210 directly to the block 230.

At the block 230, the system detects information regarding activated call forwarding for a mobile communication number of the user account. Call forwarding information includes, for example, the forwarding number to which incoming voice calls or messages to the mobile communication number should be forwarded, as well as the conditions under which the incoming calls will be forwarded. For example, call forwarding may be configured such that incoming calls to the mobile communication number are forwarded unconditionally or forwarded when the mobile communication number is busy. As described in greater detail herein, to determine if calls to the mobile communication number (e.g., a telephone number) of the account are being forwarded, the system utilizes an associated unique subscriber identifier (e.g., an international mobile subscriber identity, or "IMSI") to obtain call forwarding information from a telecommunication network.

At a decision block 240, the system determines, based on the obtained call forwarding information, whether any call forwarding configured for the mobile communication number is indicative of a possibility of fraud. Forwarding conditions that are indicative of a possibility of fraud include call forwarding to a number that is not recognized or associated with a user, call forwarding to a number that has been associated with prior fraudulent activities, call forwarding to a foreign country, etc. Call forwarding, if configured fraudulently, could be used to undermine the use of the mobile communication number for further authentication of the purported user. If it is determined that the obtained call forwarding information is indicative of a possibility of fraud (e.g., calls to the mobile communication number are configured to unconditionally forward to a number associated with previous fraudulent activities), then processing continues to the block 275. If none of the obtained call forwarding information is indicative of a possibility of fraud, processing continues to a block 250. The operation of blocks 230 and 240 is described in greater detail in FIG. 3

At the block 250, the system performs code-based authentication of the purported user. The system may, for example, generate a one-time code used to verify the purported user's possession of a mobile communication device associated with the user account. The system may then transmit the one-time code to the mobile communication device using a mobile communication number associated with the device. The one-time code may be transmitted to the mobile communication device using, for example, an SMS or other type of message, an application installed on the mobile communication device and associated with the system or network-accessible service, a website, a voice call to the mobile communication device that recites the one-time code, etc. Following receipt of the one-time code, the user responds by providing a responsive code to the system through a communication channel or device distinct from that used to receive the one-time code. For example, the user may transmit the responsive code using the computing device used to access the network-accessible service via a data channel. The system then compares the one-time code and the responsive code to determine if they match. In some embodiments, the system may transmit the one-time code to the user via the computing device used to access the service, and the user may transmit the responsive code via an SMS message from the mobile communication device; in those embodiments the system may additionally verify the SMS message containing the responsive code is received from the mobile communication number associated with the account of the purported user.

In some embodiments, when fraud conditions are detected, the process 200 may still continue to block 250 rather than terminate at block 275. In those embodiments in which the process 200 continues to the block 250 even when fraud conditions are detected, the further authentication of the purported user may be modified. For example, in addition to the code-based authentication check described with respect to block 250, other authentication checks may be performed. For example, the system may maintain location information associated with previous successful authentications of the user, and may determine whether the current location of the mobile communication device (obtained, for example, using a Global Positioning System (GPS) receiver of the mobile communication device or based on the known location of telecommunication towers in range of the mobile communication device) is within a threshold distance of any of the pervious locations. As a further example, the user may be prompted to answer an additional security question, which may have been previously answered by the user in connection with establishing an account with the service. As a still further example, the system may utilize a communication channel other than that associated with the mobile communication number (e.g., code exchange via an application running on the mobile communication device associated with the purported user). As an additional, the system may provide the network-accessible service with an indication that conditions linked to a likelihood of fraud were detected. The service may use the fraud indication to, for example, limit the extent of account access to the user or to request additional information once the user has been granted access to the service. It will be appreciated that, with the benefit of recognizing potential fraud situations based on call forwarding conditions, other security measures may be used by the system and network-accessible services to further authenticate a purported user when required.

At a decision block 260, the system determines if the purported user has been authenticated. The purported user may be authenticated if, for example, the exchanged one-time code and responsive codes match and if there is no indication of fraud associated with the mobile communication number used for the code exchange. If it is determined that the user is authenticated, the process continues to a block 270 and the user is granted access to the network-accessible service. In some embodiment the system grants the user access to the network-accessible service. In some embodiments the system indicates to the network-accessible service that the user has been authenticated and that the service may grant the user access. The process then terminates. If it is determined that the user is not authenticated, the process continues to the block 275.

At the block 275, user access to the network-accessible service is denied. In some embodiments the system denies the user access to the network-accessible service. In some embodiments the system send a message to the network-accessible service indicating that the user authentication attempt failed.

Although FIG. 2 illustrates an embodiment in which a request to access a network-accessible service includes information identifying a user account (e.g., a username and a password) as part of an overall user authentication, it will be appreciated that the system may authenticate the access request without the same degree of identifying user information. For example, in some embodiment the system may receive only username but no password in connection with request. In said embodiment the system may or network-accessible service may verify that the username is registered with or known to the service. As a further example, in some embodiment the system may receive neither a username nor password. In said embodiment the system may, for example, authenticate the request using only code-based authentication, based on a mobile communication number obtained using information received as part of the request.

Flows for Identifying Fraud Based on SS7 Call Forwarding Information

Figure 3:
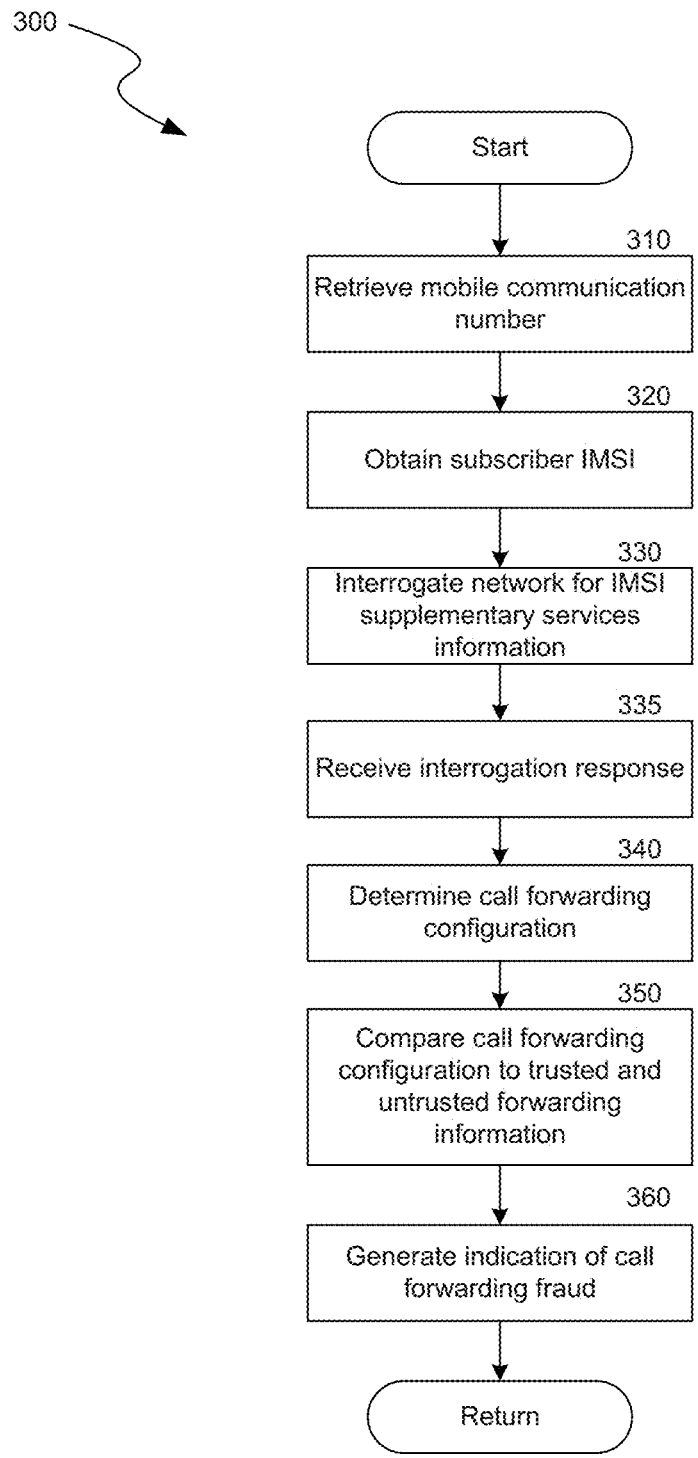
FIG. 3 is a flow chart of a process implemented by the SS7-call-forwarding-based user authentication system to evaluate user call forwarding information for indications of fraud.

FIG. 3 is a flow diagram illustrating example process 300, implemented by a SS7-call-forwarding-based user authentication system, for identifying instances of fraud based on call forwarding information associated with a mobile communication number. The process 300 may be used as part of authentication flow, such as the process 200 and the operation of blocks 230 and 240 as illustrated in FIG. 2.

The process 300 begins at block 310, where the system retrieves a mobile communication number for a mobile communication device associated with a user account. The mobile communication number may have been previously provided by a user, for example, during an account registration step used to create an account with a network-accessible service. That is, when creating an account with a service, the user may be asked to provide (or may be provided) a username and a password for the service. The user is also asked to provide a mobile communication number associated with a mobile communication device that the user controls. The mobile communication number may be stored by the service or the system in association with the user's registered account, and may be subsequently retrieved by the system based on account information (such as a username provided as part of a request to access the service).

In some embodiments, rather than obtaining the mobile communication number based on a prior association with a user account, the system may retrieve the mobile communication number directly from the mobile communication device of the user. For example, an application on the mobile communication device may obtain the mobile communication number using device-supported application programming interfaces. The application may obtain the mobile communication number in response to, for example, the user attempting to access the network-accessible service with the application, based on a request from the service, or based on a request from the system.

At a block 320, the system obtains the international mobile subscriber identity ("IMSI") corresponding to the user's mobile communication number. The IMSI, which uniquely identifies each subscriber on a wireless telecommunication network, may be obtained by querying the telecommunication network. For example, the system may use the mobile communication number, or associated mobile subscriber ISDN number ("MSISDN"), to send a Send Routing Information for Short Message ("SRI SM") to the SS7 network. Following SS7 protocols, the SRI SM request is forwarded through the network to the home location register ("HLR") associated with the subscriber corresponding to the mobile communication number. The HLR responds with the IMSI associated with the provided mobile communication number. In some embodiments, the system may obtain the IMSI directly from the mobile communication device. For example, an application running on the mobile communication device associated with the system or the network-accessible service may obtain the IMSI from the mobile communication device using operating system interfaces. The device-obtained IMSI may then be transmitted to the system and stored in association with the user's account information.

At a block 330, the system interrogates the SS7 network for information on supplementary services associated with the user's mobile communication subscription using the obtained IMSI. The system may obtain information on various supplementary services, or may specifically request information on call forwarding. For example, the system may send an InterrogateSS request on the SS7 network that includes as a parameter the supplementary services code corresponding to call forwarding (e.g., "InterrogateSS(forwardingInfo)"). Following SS7 protocols, the InterrogateSS request is routed to the HLR associated with the subscriber. In response to the InterrogateSS request, the HLR responds with information on supplementary services associated with the subscriber corresponding to the IMSI (i.e., the user).

At a block 335, the system receives the response to the interrogation request. The InterrogateSS response includes, for example, a forwardingFeatureList datum that defines the call forwarding status of the user. The InterrogateSS response may also include supplementary service state information which provides, for example, whether the supplementary service has been provisioned, whether it has been registered, whether it has been activated, and whether it has been quiesced (i.e., a P-bit, a R-bit, an A-bit, and a Q-bit). Because it has been observed that carrier networks are more likely to respond to third-party InterrogateSS requests than they are other status-inquiry messages, the use of the InterrogateSS request improves the likelihood of obtaining supplementary services information even when the network through which the system initiates its request is external to the network of the subscriber (where the HLR is located).

At a block 340, the system determines the call forwarding configuration for the user based on the SS7-network-obtained InterrogateSS response. For example, the forwardFeatureList received as part of the InterrogateSS response is made up of one or more forwardFeature datums, each of which describes a different call forwarding parameter for the user. That is, if a user has call forwarding configured to forward to one of two different telephone numbers depending on the condition, the received forwardFeatureList would include two forwardFeature parameters. Each forwardFeature parameter includes status information (e.g., whether the particular forwarding parameter is active), the number to which incoming calls are to be forwarded ("the call forwarding number"), and the forwarding reason (i.e., the "type" of call forwarding, indicating the reason why calls would be forwarded according to that parameter). For example, the forwarding reason may be encoded as a field as part of the forwardFeature parameter as follows:

| Value | Forwarding reason |
|---|---|
| 00 | Device not reachable |
| 01 | Device busy |
| 10 | No reply |
| 11 | Unconditional |

That is, the received InterrogateSS response indicates, for each of the different call forwarding parameters configured for the user, the number to which calls will be forwarded and the reason or condition under which the calls will be forwarded. As indicated by the encoding of the forwarding reason of the forwardFeature parameter, a user's call forwarding may be configured such that incoming calls will be forwarded to the call forwarding number unconditionally, when the associated mobile communication device is unreachable or powered off, when the mobile communication device is busy, or when there is no reply or answer to an incoming call.

At a block 350, the system compares the determined call forwarding configuration of the user to known trusted and untrusted forwarding information. For example, as described in greater detail with respect to FIG. 4, the system may maintain a record of call forwarding configurations that are known to be trusted (i.e., not indicative of fraud) and call forwarding configurations that are known to be untrusted (i.e., indicative of fraud). The system may maintain known trusted and untrusted information that is associated with particular users (based on information that uniquely identifies the user as a subscriber to a telecommunication network, such as a mobile telecommunication number or an IMSI). That is, the system may maintain information indicating that for a particular user certain call forwarding configurations are trusted or untrusted. The system may additionally maintain known trusted and untrusted information that is not associated with any particular users, but rather is applicable to all users being authenticated by the system. The determined call forwarding configuration of the user is compared to the maintained trusted and untrusted forwarding information to identify whether call forwarding is currently configured for the user in a manner that matches one of the known trusted or untrusted configurations. A match may occur based on the generally maintained trusted or untrusted call forwarding information, or based on the maintained trusted or untrusted call forwarding information for the particular user.

At a block 360, the system generates an indication of whether the call forwarding configuration of the user is indicative of a possibility of fraud. In some embodiments, the indication of fraud is based on the result of comparing the current call forwarding configuration of the user to the maintained trusted and untrusted information. For example, the system may generate an indication of fraud when any configuration of call forwarding is detected for the user, unless the call forwarding configuration matches a known trusted configuration. As a further example, the system may only generate an indication of fraud when the detected call forwarding configuration of a user matches a known untrusted configuration. Though described as an indication of fraud or not fraud, in some embodiments the system generates a fraud score based on the call forwarding configuration. For example, in a representative embodiment in which the system generates a fraud score from 0.0 (indicating no chance of fraud) to 1.0 (indicating very high likelihood of fraud), the system may generate a baseline fraud score (e.g., 0.5) when any call forwarding is detected, and then adjust the score up or down based on whether the call forwarding configuration matches known trusted or untrusted configurations. As described herein, the generated fraud indication or fraud score is used by the system to determine how to further authenticate a user requesting access to a network-accessible service.

Although FIG. 3 illustrates an embodiment in which a detected call forwarding configuration of a user is compared to known trusted and untrusted forwarding information to generate an indication of fraud, it will be appreciated that the system may generate the fraud indication based on alternative or additional mechanisms. For example, in some embodiments the system may indicate fraud whenever call forwarding is configured for the user, or may indicate fraud whenever call forwarding is configured with a particular forwarding type (e.g., unconditional call forwarding). In some embodiments, the system indicates fraud when call forwarding is set to a forwarding number with a country code different from the country code of the mobile communication number associated with the user. In some embodiments, the system indicates fraud when call forwarding has been configured for the user within a threshold recency (e.g., within the last 12 hours). It will be appreciated that other evaluations of the call forwarding configuration of a user may be performed to assess a likelihood of fraud based on call forwarding information.

Illustrations of Call Forwarding Information Used for Fraud Detection

FIG. 4 illustrates tables 400 and 450 of user-specific and general call forwarding fraud information, respectively. As described herein, the SS7-call-forwarding-based user authentication system may maintain known trusted and fraudulent call forwarding configurations, such as illustrated in tables 400 and 450, to in part determine whether a call forwarding configuration for a user is indicative of a likely or known fraudulent condition.

Table 400 illustrates a representative table of user-specific call forwarding fraud information as may be used by the system. The table is user-specific in that each entry in the table is associated with a specific user (where, as illustrated in the table, user-specific information is maintained based on the phone number associated with the user). When table 400 is used by the system for a fraud assessment, configurations in table 400 only influence the call forwarding fraud determination for the corresponding user. Each entry in the table 400 has a phone number field 405, which contains the phone number of a user used as part of an authentication process, to which the entry applies. Each entry also includes a forwarding type field 410 and forwarding number field 415, characterizing aspects of the maintained configuration. The table may additionally include a fraud status field 420, which indicates whether each entry corresponds to a known fraudulent or trusted condition. For example, based on the table 400, the system may recognize that unconditional call forwarding from the phone number (555)123-0123 to the forwarding number (555)555-1212 is a known trusted condition, while unconditional call forwarding from the same phone number to the forwarding number (212)222-3333 is indicative of a possibility of fraud. As a further example, based on the table 400, the system may recognize that call forwarding on not reachable from the phone number (412) 222-3333 to (412)111-2222 is a known trusted condition. Though table 400 illustrates an embodiment in which user-specific call forwarding fraud information is maintained based on the phone number associated with the user, it will be appreciated that other identifiers uniquely identifying the user may be used. For example, the system may maintain call forwarding fraud information in association with a username, with an IMSI associated with the user's subscription to a telecommunication network, with an international mobile equipment identity ("IMEI") associated with the user's mobile communication device, etc. It will be appreciated that other unique identifiers associated with a user or a user's mobile communication device may be used.

Table 450 illustrates a representative table of general call forwarding fraud information as may be used by the system. The table is general in that entries in the table are not associated with a specific user, but rather may influence the call forwarding fraud determination for any user being authenticated by the system. Each entry in the table 450 has a forwarding type field 455, a forwarding number field 460, and a fraud status field 465, and characterizes a known fraudulent or trusted call forwarding condition. For example, a carrier may implement its voicemail service by forwarding unanswered calls to the number (555)555-1212. Accordingly the system may, as reflected in the example table 450, maintain an entry that indicates that forwarding to (555) 555-1212 due to no reply is a trusted (i.e., not fraudulent condition). As a further example, it may have been identified that the forwarding number (212)222-3333 has been frequently associated with fraud, and therefore the table 450 may include an entry that call forwarding configured to that number should be treated as fraudulent.

Though the tables 400 and 450 illustrate storing telephone numbers to which calls are forwarded, it will be appreciated that the entries may store different information to facilitate fraud detection. For example, an entry may include an area code and prefix of a forwarding number, which identifies the carrier to which calls are being forwarded, though not the particular carrier number. Such entries enable the system to, for example, maintain information regarding carriers that have been previously associated with call forwarding used for fraudulent purposes (e.g., call forwarding to a prepaid number offered by the carrier). Accordingly, the system can detect when a user's call forwarding configuration involves call forwarding to such a carrier.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A computer-implemented method for granting a user access to a network-accessible service, the method comprising:
   maintaining data reflecting call forwarding configurations, wherein each call forwarding configuration comprises a call forwarding type and a call forwarding number, the call forwarding number characterizing a number to which a call is forwarded;
   receiving a request from a user to access a network-accessible service;
   identifying a mobile telephone number associated with the request;
   obtaining a subscriber identifier associated with the mobile telephone number;
   transmitting, to a telecommunication network, a query of supplementary services associated with the subscriber identifier;
   receiving, from the telecommunication network, a query response that comprises information of supplementary services associated with the subscriber identifier, the supplementary services information comprising forwarding information associated with the subscriber identifier;
   evaluating the received supplementary services information to detect conditions indicative of fraud, wherein the evaluation is based on comparing the forwarding information associated with the subscriber identifier to the call forwarding numbers of the maintained call forwarding configurations;
   generating, based on whether a condition indicative of fraud is detected, an authentication request;
   receiving an authentication response from the user in response to the authentication request; and
   granting or denying the user access to the network-accessible service based on the authentication response.

2. The method of claim 1, wherein the subscriber identifier is an international mobile subscriber identity (IMSI).

3. The method of claim 2, wherein the IMSI is obtained by querying the telecommunication network.

4. The method of claim 1, wherein the forwarding information describes whether incoming communications to the mobile telephone number are being forwarded to a forwarding number.

5. The method of claim 4, wherein at least one of the incoming communications is a voice call.

6. The method of claim 4, wherein at least one of the incoming communications is a short message service (SMS) message.

7. The method of claim 1, wherein the transmitted query of supplementary services is an InterrogateSS request.

8. The method of claim 1, wherein a fraud condition is detected when at least one incoming communication to the mobile telephone number is being forwarded to one of the call forwarding numbers of the maintained call forwarding configurations.

9. The method of claim 1, wherein a fraud condition is detected when at least one incoming communication to the mobile telephone number is being forwarded to one of the call forwarding numbers of the maintained call forwarding configurations, the one of the call forwarding numbers having a country code different from a country code of the mobile telephone number.

10. The method of claim 1, wherein at least one of the maintained call forwarding configurations further comprises a fraud status indicating whether the corresponding call forwarding configuration is a known fraudulent or known trusted configuration.

11. The method of claim 1, wherein the data further comprises at least one entry indicating a known fraudulent telecommunication provider.

12. The method of claim 1, wherein the authentication request comprises a one-time code or a pre-set challenge question.

13. The method of claim 1, wherein the received supplementary services information characterizes which supplementary services have been provisioned for the mobile telephone number.

14. A non-transitory computer readable medium containing instructions configured to cause one or more processors to perform a method of granting a user access to a network-accessible service, the method comprising:
   maintaining data reflecting call forwarding configurations, wherein each call forwarding configuration comprises a call forwarding type and a call forwarding number, the call forwarding number characterizing a number to which a call is forwarded;
   receiving a request from a user to access a network-accessible service;
   identifying a mobile telephone number associated with the request;
   obtaining a subscriber identifier associated with the mobile telephone number;
   transmitting, to a telecommunication network, a query of supplementary services associated with the subscriber identifier;
   receiving, from the telecommunication network, a query response that comprises forwarding information associated with the subscriber identifier;
   evaluating the received forwarding information to determine whether at least one incoming communication to the mobile telephone number is being forwarded to one of the call forwarding numbers of the maintained call forwarding configurations; and
   granting or denying, based on the evaluation of whether incoming communications to the mobile telephone number are indicated as being forwarded to one of the call forwarding numbers of the maintained call forwarding configurations, the user access to the network-accessible service.

15. The non-transitory computer readable medium of claim 14, wherein the subscriber identifier is an international mobile subscriber identity (IMSI), and wherein the IMSI is obtained by querying the telecommunication network.

16. The non-transitory computer readable medium of claim 14, wherein the transmitted query of supplementary services is an InterrogateSS request.

17. The non-transitory computer readable medium of claim 14, wherein at least one of the maintained call forwarding configurations further comprises a fraud status indicating whether the corresponding call forwarding configuration is a known fraudulent or known trusted configuration.

\* \* \* \* \*